United States Patent [19]

McGuire

[11] Patent Number: 5,434,672
[45] Date of Patent: Jul. 18, 1995

[54] PIXEL ERROR DIFFUSION METHOD

[75] Inventor: Michael D. McGuire, Palo Alto, Calif.

[73] Assignee: Hewlett-Packard Company, Palo Alto, Calif.

[21] Appl. No.: 82,126

[22] Filed: Jun. 23, 1993

[51] Int. Cl.$^6$ ............................................... H04N 1/21
[52] U.S. Cl. .................................... 358/296; 358/456; 358/459
[58] Field of Search ................. 346/108, 107 R, 76 L, 346/1.1, 160; 358/296, 298, 300, 302, 456, 459

[56] References Cited

U.S. PATENT DOCUMENTS 4,930,018  5/1990  Chan et al. ........................ 358/298
5,111,302  5/1992  Chan et al. ........................ 358/298

Primary Examiner—Mark J. Reinhart

[57] ABSTRACT

Error distribution in printing and information processing systems is accomplished according to combined internal and external super-pixel error diffusion techniques, effective for distributing whole or fractional error contributions both within and without a selected super-pixel. For a particular super-pixel, error amounts of a selected internal subject pixel are provided to another internal subject pixel until a determined or selected final pixel error value within the selected super-pixel has been determined. This final, internal error value is distributed fractionally or wholly among selected super-pixels within a predetermined super-pixel neighborhood.

9 Claims, 3 Drawing Sheets

PIXEL ERROR DIFFUSION METHOD

TECHNICAL FIELD

The field of this invention is that of continuous-tone color and gray scale (i.e., "con-tone") image representation and processing, and more particularly that of error diffusion techniques in con-tone image representation and processing with respect to the graphical and printing arts.

BACKGROUND

State-of-the-art printing and graphics systems, whether based upon laser jet technology or upon more recently developed thermal ink jet concepts, are able to convert images initially represented as con-tone images into digital representations which can be produced in print and on visual displays at various resolution levels. Current popular resolution levels typically produce about 300 or 600 full or partial tone dots per inch on paper, plastic, or another selected physical surface of choice. According to a typical digital conversion scheme, a continuous physical image can be restructured in software as a matrix of point values for digital processing after which the physical image is reconstituted and reestablished as a two-dimensional array of full or partial tone dots of ink and pigment or as photons of light on a display screen. If the selected tone of the dot on the paper or on the display is colored "black," then the dot can either be a full-tone black dot, for example, or the absence of such a dot at a given presentation position. Given a suitable resolution and depending, of course, upon the distance of the viewer from the physical image being viewed, this composite graphical representation or image can evoke the impression of a continuous, gray scale image.

Con-tone images are currently capable of digital processing to establish full-tone dot images on paper by physical print operation or on a display apparatus, according to user selection. Image enhancement can further be accomplished by varying the size of the dots placed at particular matrix positions. Additional image enhancements are possible by varying the intensity or the tone fullness of the dots themselves. According to one toning approach, namely half-toning, a considerable level of image enhancement can be accomplished. According to this technique of digital half-toning, gray scale and color tone images can be represented as discrete binary (black and white, or color and white only) information elements in printer memory and information processing systems. The half-toning techniques which have been developed in the prior art aim to ensure the essential maintenance or impression of the original physically viewable con-tone image in digitized form. Simply stated, the original con-tone image is disassembled into a grid or array of picture elements or "pixels," as they have come to be known. The pixels themselves, notably, are referred to frequently by a nickname of their own: "pics." Each pixel (or "pic") can be represented by a corresponding number to indicate a predetermined intensity level between selected outer bounds or limits of darkness and brightness, e.g., between black and white, or for example between an intense selected color or tone level and its complete absence. Typical colors or tones may include cyan, magenta, yellow, and black, for example. Cyan is well known as a particularly distinctive blue-green shade; magenta, on the other hand, evokes the impression of a scarlet raspberry hue. Usefully, cyan and magenta can be combined to create pure blue; yellow and magenta express themselves in combination as red; and cyan combined with yellow produces an effective green.

With any of these colors, it is possible according to the prior art to present selected con-tone images to the viewer or reader in terms of a physical output grid of picture elements, pixels or pics, with each such picture element constituting a small part of the total original con-tone picture image. The con-tone physical image thus produced can be viewed in terms of the intensity of a particular tone which has been selected. An example of such a tone can of course be the color "black." The black tone can specifically be established by producing a 100% grey con-tone intensity effective for producing a solid "black" picture element. Gray tone impressions can be produced with full tone black dots by making a binary representation of portions of a selected image in terms of ones, "1's," and zeros, "0's." Accordingly, "one" values are assigned for all pixels which in con-tone are gray to the extent of at least fifty percent (50%). Any con-tone gray intensity which is less than fifty percent in intensity will accordingly be represented as a "zero" value on the binary scale. As suggested above, the same approach used for gray con-tone scaling can apply to colored con-tone images.

Further, in accordance with currently used half-toning processes, the increased spatial resolution offered by advanced binary printer models now on the market may be traded for lower spatial resolution and increased tonal resolution. In other words, instead of striving to maximize the number of dots per inch, by employing the techniques of con-tone toning, larger pixel sizes (i.e., super-pixels) can be employed while still obtaining the desired level of apparent resolution, by simply varying the tone intensity of the particular dots actually physically printed. Simply stated, a continuous image can be approximated by the use of con-tone imaging techniques with relatively large (i.e., not optimally small) pixel sizes. With black and white pixels, this can be accomplished by printing an aggregate of black and white dots, which at normal viewing distance produce the effect or appearance of continuous gray shades.

In order to enhance images produced by modern half-toning techniques, well-known error diffusion techniques, as expressed by Floyd and Steinberg, can be employed. See, for example, Floyd, R. W. and Steinberg, L.; "An Adaptive Algorithm For Spatial Gray Scale;" SID 75 Digest; *Society for Information Display,* 1975, at pages 36–37. Also see, Meyer, J. D., Dispoto, G. J., and Mather, L. R.; U.S. Pat. No. 4,680,645, which was granted by the U.S. Patent and Trademark Office on Jul. 14, 1987, under the title, "*Multiple Level Error Diffusion.*" The main reason for the elaborate scheme of division and distribution of error in the Floyd-Steinberg method is to minimize visual artifacts. In particular, Floyd and Steinberg's techniques reduce artifacts by sending 7/16 of the error observed at a particular pixel position being processed to the pixel on the same line which is to be processed next. 1/16 of the same error is sent to the pixel directly below the next pixel to be processed; 5/16 of the error is sent to the pixel directly below the one being processed; and finally 3/16 or the error is sent to the pixel diagonally below and to the left of the pixel currently being processed. This approach is illustrated by FIG. 1 attached herewith and is explicitly set forth in Table I immediately below.

TABLE I

[Prior Art]
"ERROR DIFFUSION UNDER FLOYD & STEINBERG"

PIXEL 1: Processing for this pixel (PIXEL 1) has been completed.
PIXEL 2: This pixel (PIXEL 2) is being processed and is subject to a predetermined "ERROR" level.
PIXEL 3: This pixel (PIXEL 3) is subject to an ERROR allocation in the amount of 7/16 of the ERROR at PIXEL 2.
PIXEL 4: This pixel (PIXEL 4) receives an allocation of ERROR in the amount of 3/16.
PIXEL 5: This pixel (PIXEL 5) receives an allocation of ERROR in the amount of 5/16.
PIXEL 6: This pixel (PIXEL 6) receives an allocation of ERROR in the amount of 1/16.

According to this approach to implementing Floyd & Steinberg, the spatial resolution of the input image being processed and the output image to be presented after processing will be maintained at the same level. Unfortunately, as output resolution levels increase to higher and higher output levels in terms of dots per inch printed for example, a prohibitive level of data storage and computation is required. For example, according to current product line projections, binary printer resolution goes as high as 2500 dots per inch (dpi) in the case of photo-typesetter systems. This level of output resolution effectively overwhelms current printer data processing system capabilities.

However, since it is well known that at normal viewing distances (e.g., 10-12 inches), continuous tone images appear essentially faultless in terms of spatial resolution on the order of approximately 150 dpi. Accordingly, despite the higher resolution levels available at the printer output, there is an opportunity to control data processing loads by accepting a lower, nonetheless acceptable resolution level.

This has been accomplished to a limited extent within the current prior art. For example, a digitized computer image can be published with a typical binary-raster printer or display device at a resolution level set by the image initially acquired through a scanner as an input raster con-tone image on the order of 8-bits con-tone. The output printer device exhibits the same spatial resolution capabilities as the input scanner. In processing the input digitized con-tone image at the given resolution level, the data is examined line by line, and pixel by pixel. With each pixel, the question is asked, whether its gray value is closer to black (which is say 0 on the 8 bit con-tone), or closer to white (i.e., 255 on the 8 bit con-tone scale. Each input pixel data item is thus represented at a corresponding binary output pixel level set at either black or white, for example. Then, a difference value between the input value for the pixel and its output level set to either black (0) or white (255) is established. This is the error which is divided up, distributed and added to adjacent pixels yet to be processed. Thus, a light-gray input would be printed white, and the adjacent pixels would be diminished by the error to darker grays, which if sufficiently high would result in printing a black output when their turn to be processed comes. According to this prior art approach, an area of input pixels having a particular shade of gray will result in a mix of black and white output pixels, which if viewed at an appropriate distance would present a desired accurate appearance of that same shade of gray. The method has, according to the prior art, additionally been extended beyond merely application to binary printers to printers with a number of levels of gray and to color printers as well, these being effective for printing dots using a restricted number of primary colors, but nonetheless achieving the desired appearance of continuous variation in value, hue and chrome at appropriate viewing distances. However, various undesirable artifacts nonetheless appear at the printer output when this technique is used, depending on how the error is divided up and distributed. These undesirable effects may take on the appearance of lines or worms, for example, which were clearly not present at the input con-tone image.

It is accordingly an object of the invention to enable the printing, reproduction, and display of physical images from selected printers and displays which simulate the impression of selected physical input con-tone images without suffering the disadvantageous data processing loads associated with printer systems handling large input pixel data streams, while at the same time minimizing visual artifacts which commonly appear in the output presentation printer or image display.

SUMMARY OF THE INVENTION

According to the invention, error diffusion is accomplished by combined super-pixel error diffusion and intra-super-pixel error diffusion among the subject pixels within a selected super-pixel. Super-pixel representations of physical images are processed for subsequent presentation by diffusing error values derived by taking differences between input and output portions of the physical images being processed, and the error values are diffused with respect to a selected super-pixel of predetermined dimensions and residing in a predetermined super-pixel neighborhood, and further with respect to selected subject pixels within the selected super-pixel, each of them being subject pixels within the selected super-pixel and having an assigned error value. A preferred mode of error diffusion would be to diffuse contributions of the error of a selected subject pixel in a selected super-pixel to selected neighboring super-pixels, according to a desired fractional distribution scheme. The selected subject pixel within the selected super-pixel will have had its error established according to an error distribution scheme accomplished among the individual subject pixels within the selected super-pixel. According to one such internal error distribution scheme within the meaning of the invention, error diffusion is accomplished among all or a selected subset of the subject pixels within the selected super-pixel. According to a preferred error diffusion scheme internal to super-pixels, the entire error of a pixel within a super-pixel is provided to a next pixel and so on until a determined or selected subject pixel within the super-pixel produces a final error value for the super-pixel which is then distributed fractionally or otherwise among selected or predetermined adjacent super-pixels (and of course to some or each of the subject pixels within each such selected neighboring super-pixel).

The invention herein is particularly directed toward diffusing error values among subject pixels within a super-pixel of selected pixel dimensions. The super-pixel is made up of a plurality of subject pixels. Each of the subject pixels has an associated error value. The method of the invention particularly involves distributing at least a portion of the error value of a selected first subject pixel of a selected super-pixel to another subject pixel within the super-pixel. As a result, a resultant error value is established for another subject pixel within the super-pixel. A resultant super-pixel error value is established, based upon the error of a selected subject pixel within the particular super-pixel. Finally, the resultant super-pixel error is distributed at least in part to selected super-pixels of a predetermined super-pixel neighborhood associated with the super-pixel which has been subject to internal error diffusion. The distribution of error within a super-pixel is accomplished at least in part by distributing the entire error associated with a particular subject pixel to another subject pixel within the super-pixel. Further, the distribution of error among the subject pixels within a super-pixel is subject to accomplishment according to a predetermined, ordered sequence. This is for example accomplished by taking the error of a first subject pixel within a selected super-pixel and adding the entire error of that first subject pixel to the current error of an adjacent subject pixel within the super-pixel. If the first subject pixel of a 2-by-2 super-pixel is at the upper left-hand corner of the super-pixel, the error allocation or error diffusion can be accomplished either to the next subject pixel in a downward direction or to the next subject pixel in a rightward direction. If done in a downward direction, the next error diffusion can be accomplished in a rightward direction, and then finally in an upward direction, to account for all four subject pixels in the 2-by-2 array. According to one approach, the entire error of a given subject pixel is subject to allocation to a next subject pixel within the super-pixel. However, the invention herein also covers the accomplishment of error allocation of only a portion of the error of a particular subject pixel within a super-pixel to an adjacent subject pixel within the selected super-pixel. In any case, it is clear that it is within the concept of the invention to redetermine the error of each subject pixel within a selected super-pixel according to a predetermined order of succession. Further, the error of a subject pixel which is last in the predetermined order of succession can be deemed to be the resultant error value representative of the entire selected super-pixel, and the resultant error can be allocated to selected adjacent super-pixels, according to inventive concept herein. Additionally included as part of the invention herein is the error diffusion process according to which at least a portion of the super-pixel error value to be distributed to other super-pixels in the neighborhood is applied to each of the pixels within the other super-pixels. According to one version of the invention, the error portions allocated to the subject pixels of a selected neighboring super-pixel are equal in value. Additionally, the distribution of super-pixel error values to neighboring super-pixels can be accomplished according to a scheme of fractional allocation. According to this approach, a fraction of the error is allocated to one selected adjacent or neighboring super-pixel, and other fractions thereof are allocated to other selected ones of the adjacent or neighboring super-pixels.

DETAILED DESCRIPTION OF A BEST MODE OR PREFERRED EMBODIMENT OF THE INVENTION

Figure 1:
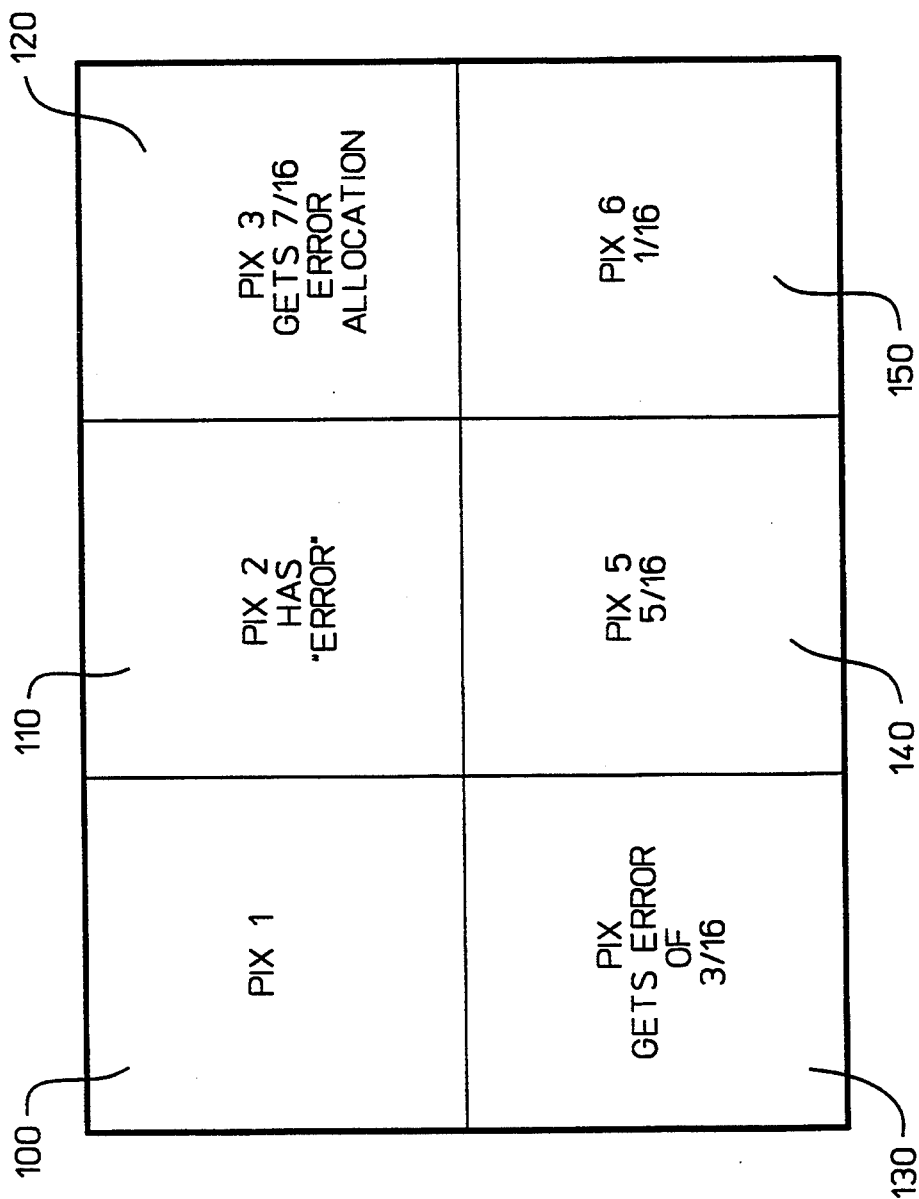
FIG. 1 shows the prior art distribution scheme for error diffusion according to the well-known Floyd-Steinberg approach.

FIG. 1 illustrates in detail the prior art distribution scheme for error diffusion according to Floyd-Steinberg. FIG. 1 particularly shows a selected group of six adjacent pixels formed in two rows and three columns. In particular, first, second, and third pixels 100, 110 and 120 are arranged in a first row; further, fourth, fifth, and sixth pixels 130, 140 and 150 are arranged in a second row of FIG. 1. These are only a few of the pixels which would be present in an actual grid array employed in actual printing operation, but they suffice to illustrate the error diffusion technique of Floyd-Steinberg.

In the Floyd-Steinberg prior art example shown in FIG. 1, pixel error processing of pixel 100, i.e., PIX 1, has been completed, and its error has been assigned to a next pixel, i.e., pixel 110, or PIX 2. This pixel 110 accordingly exhibits a new error value, i.e., "ERROR," based upon a combination of underlying con-tone error contributions from a variety of sources, including, of course, adjacent pixel 100.

Additionally according to FIG. 1, prior art error diffusion is conducted according to the prior art during the processing of data associated with pixel number two (i.e., PIX 2). As already noted, processing has been completed with respect to PIX 1. Further, the applicable printer or information processing system conducting the processing (not shown) has already interpreted the data of PIX 1 to print or otherwise display a predetermined tone or impression or lack of tone or impression on or in a selected medium representative of the data characterizing PIX 1. For convenience and clarity, reference to the particular pixels will continue in accordance with the name of the pixel, e.g., PIX 1, or PIX 2, etc., rather than with the number of the corresponding pixel, respectively, 100 or 110, as the case may be.

Based upon the level of the ERROR associated with PIX 2, the printer similarly prints or publishes the applicable data determined impression or tone, and then distributes the ERROR to pixels in a preselected neighborhood of pixels. According to Floyd-Steinberg, the particular neighborhood is the neighborhood of pixels surrounding immediately processed PIX 2 which have not already been published or printed. Since printing is assumed to progress downward and from left to right, the neighborhood will accordingly be PIX 3 on the same line, but further to the right, and PIX 4, PIX 5, and PIX 6 on the next line. The Floyd-Steinberg approach calls for allocation of the error amount in fractions of the resultant error, i.e., ERROR, such that PIX 3 is allocated 7/16 of the ERROR amount as an addition to its already established error amount. Further, PIX 4 receives and additional error contribution in the amount of 3/16; PIX 5 receives, 5/16; and PIX 6 receives a 1/16 ERROR contribution.

Figure 2:
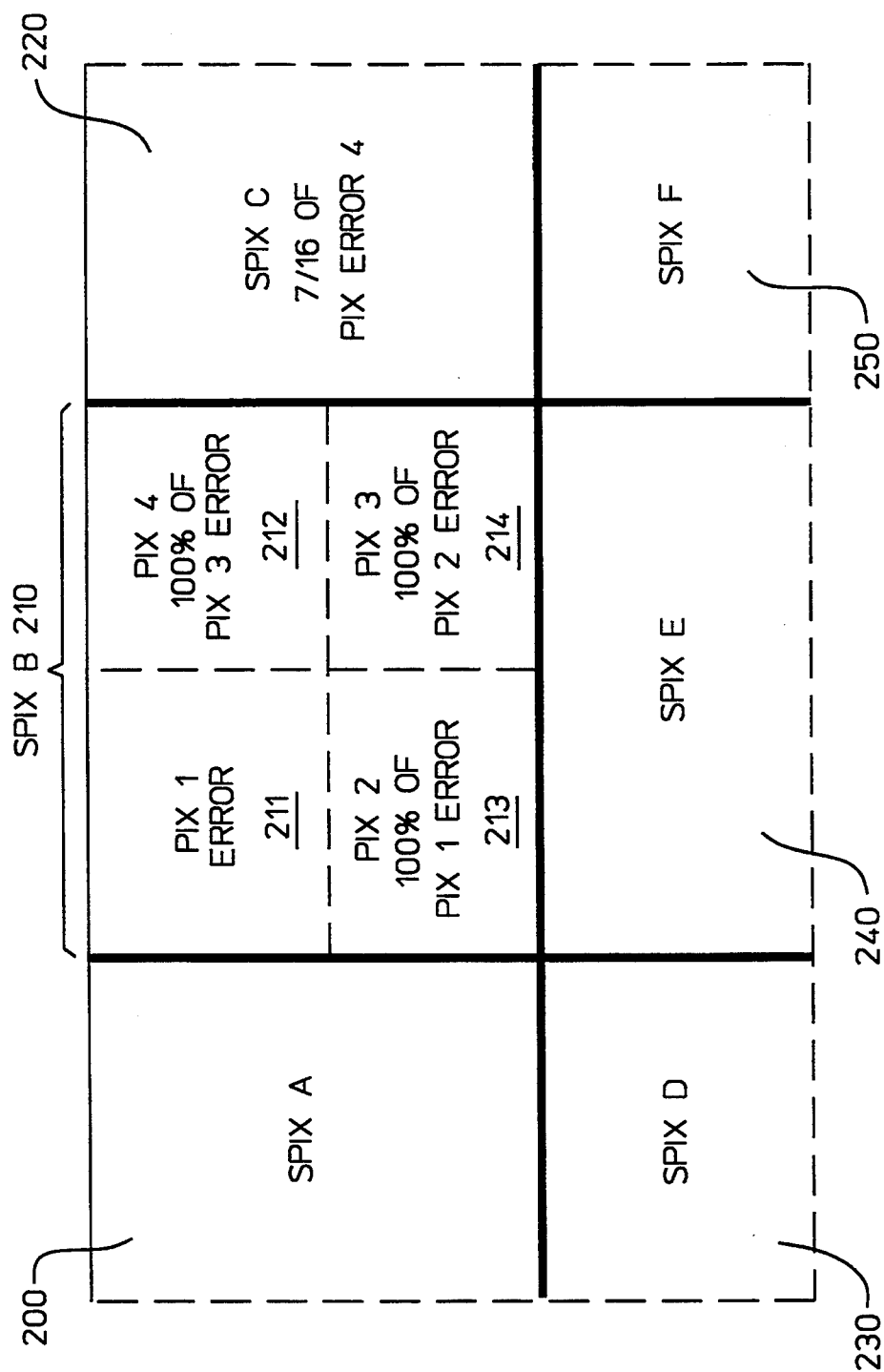
FIG. 2 illustrates the distribution scheme for error diffusion according to the invention addressed and disclosed herein.

FIG. 2 shows the distribution scheme for error diffusion according to the invention addressed and disclosed herein. As shown in FIG. 2, portions of various super-pixels are indicated, as well as in one instance, a complete super-pixel including all of its subject pixels. According to one version of the invention, each super-pixel is a two-by-two (2×2) array of subject pixels. However, according to the invention, super-pixels may be n-by-m arrays, where "n" and "m" are arbitrary positive integers of choice. Accordingly, the super-pixels may be rectangular or square, according to the particular embodiment desired.

FIG. 2 particularly shows the right portion of super-pixel 200, but not showing its breakdown into individual pixels. Also shown is a complete representation of super-pixel 210 including its subsidiary pixels 211, 212, 213, and 214. Each of these pixels is labeled with one of successive names, PIX 1 through PIX 4, in sequence of error diffusion within a super-pixel according to a preferred embodiment of the invention. Additionally, there are shown in FIG. 2 portions of respective super-pixels 220, 230, 240 and 250, super-pixel 220 being shown in the first row of super-pixels, and the remaining super-pixels 230, 240, and 250 lying on the second row shown in FIG. 2 of the drawing.

The super-pixels in FIG. 2 are respectively labeled as SPIX's. In the general case, each such super-pixel comprises a rectangle of integer "m" by integer "n" multiple of pixels as a subset. FIG. 2 illustrates particulars regarding one mode of carrying out the invention. This mode calls for two-phase error distribution. Phase one is error diffusion within a particular super-pixel, that is pixel to pixel, in a selected sequence. According to one scheme, the entire error is passed along to a selected next pixel within the super-pixel, from pixel to pixel. One mode of the invention calls for distribution to a single next selected pixel. The scheme involves a distribution which addresses each pixel within a super-pixel, but according to the invention, some pixels may be left out or omitted, without the invention addressed herein being avoided thereby.

Accordingly, the invention provides an error diffusion method for first distributing an initial error level within a target neighborhood internal to a particular super-pixel until all selected pixels within the neighborhood have been processed. The error of a selected internal pixel (which may be the last, or final internal pixel processed within the particular super-pixel) is then distributed among the super-pixels within a predetermined super-pixel neighborhood. In particular, the invention is directed toward an error diffusion method which establishes a predetermined neighborhood of pixels, with the neighborhood comprising first through n-th pixels; which then assigns the error associated with a first pixel in the predetermined neighborhood to a next pixel within the set of neighborhood pixels; then assigns the error associated the next pixel in the predetermined neighborhood to a further pixel within the set of neighborhood pixels, and so on until the error of the n-th pixel has been determined; and finally distributes the error associated with the n-th pixel among neighborhoods of pixels in the vicinity of said first neighborhood of pixels. This is effectively shown by reference to Table II, which follows on the next page:

TABLE II

| ERROR DIFFUSION | | | |
| --- | --- | --- | --- |
| Super-pixel A Processing for this pixel is complete | Pixel 1 subject to "error" | Pixel 4 receives all of Pixel 3 error | Super-pixel C (and each of its subject pixels) receives 7/16 of the error from "Pixel 4". |
| | Pixel 2 receives all of Pixel 1 error | Pixel 3 receives the entire error of Pixel 2 | |
| Super-pixel D (and each of its subject pixels) | Super-pixel E (and each of its subject pixels) receives 5/16 of the error | | Super-pixel F (and each of its subject pixels) receives 1/16 of the |

TABLE II-continued

| ERROR DIFFUSION | | |
| --- | --- | --- |
| receives 3/16 of the error of Pixel 4 | of Pixel 4 | error of Pixel 4 |

Figure 3:
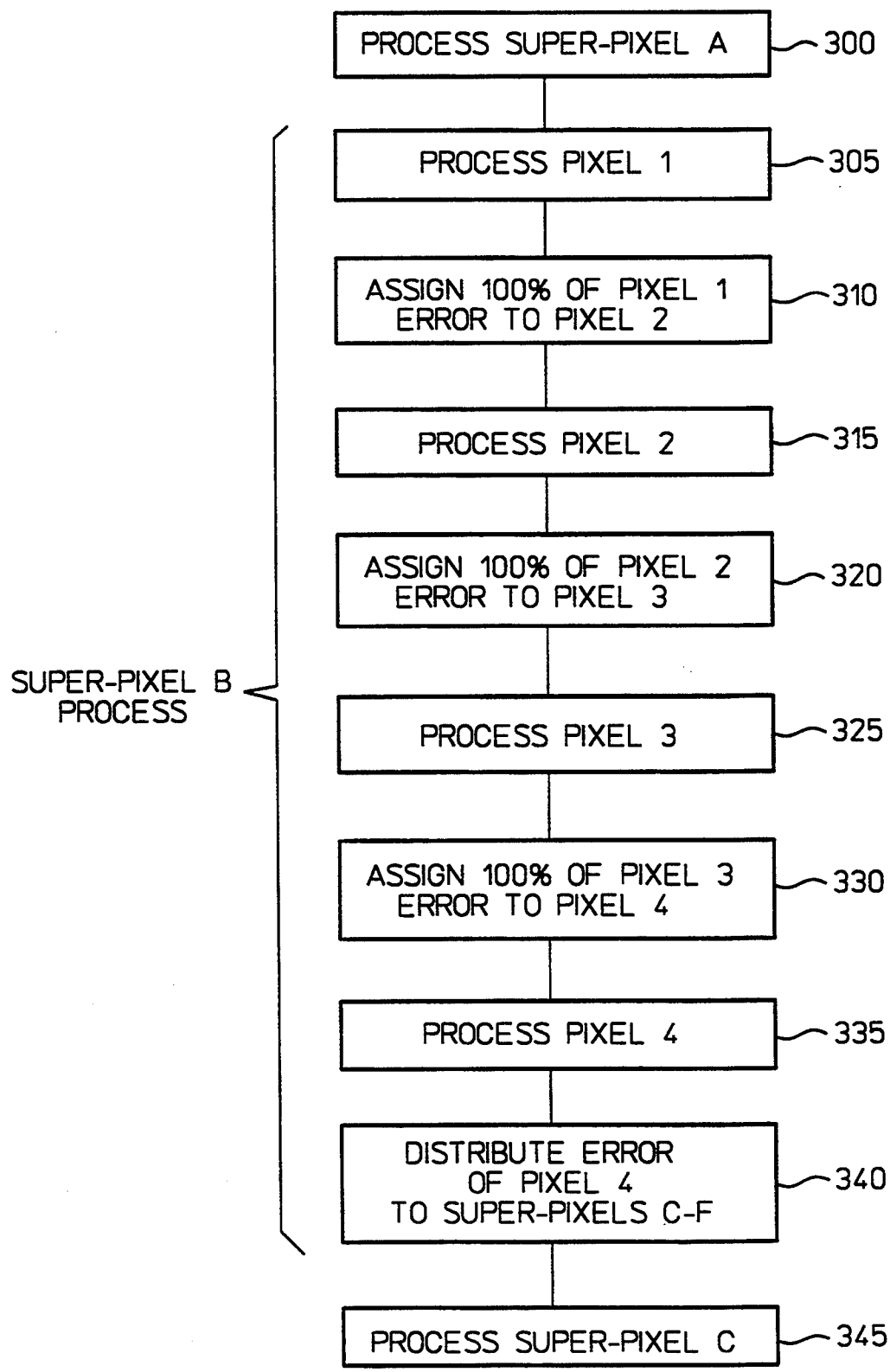
FIG. 3 is a flowchart of the error diffusion process according to the invention.

The approach of the invention is further illustrated specifically with reference to the flow chart of FIG. 3. In particular at step 300 of the flowchart of FIG. 3, SUPER-PIXEL A of FIG. 2 is shown already processed by the printing data system performing the error processing, effective to produce data to enable or effect printing of the appropriate binary indication approximating the underlying gray image of the pixel sought to be represented. As will be seen immediately below, steps 305–340 of FIG. 3 illustrate the steps of processing SUPER-PIXEL B.

In particular, as illustrated at step 305 in FIG. 3, processing of PIXEL 1 of SUPER-PIXEL B is conducted according to the invention. As already indicated in FIG. 2, SUPER-PIXEL B includes PIXELs 1–4. Further according to the invention, the initial con-tone levels of each of PIXELs 1–4 will be the same. Additionally, at the beginning of processing operation for each super-pixel, in this case SUPER-PIXEL B, the same error will already have been assigned to each of PIXELs 1–4. Thus, each of the corrected con-tone levels will be the same for all of the pixels within each super-pixel. Accordingly, when processing of PIXEL 1 is conducted, the output effect will reflect an earlier external error allocation.

Then, as indicated in connection with step 310 in FIG. 3, the final error of PIXEL 1 is assigned to PIXEL 2. Thereafter, processing of PIXEL 2 is conducted, as suggested at step 315 of FIG. 3. The process is repeated as to each of the remaining pixels within SUPER-PIXEL B, in effect pushing the error at PIXEL 1 into PIXEL 2, the error at PIXEL 2 into PIXEL 3, and then finally, the error at PIXEL 3 into PIXEL 4. This process is indicated at respective steps 320, 325 and 330. At the end of processing, the last pixel of SUPER-PIXEL B has been processed, as indicated at step 335 in FIG. 3. Then, the entire error at PIXEL 4 is distributed preferably but not necessarily equally to each of the subject pixels within respective SUPER-PIXELS C through F, in accordance with respective super-pixel allocation ratios of 7/16, 3/16, 5/16, and 1/16. The particular applicable ratios can be any fractional amounts or distribution of fractional amounts with reference to the error of a last to be processed or otherwise selected subject pixel. The concept is only that a distribution of the error of the final or otherwise selected subject pixel of a super-pixel is made within a selected neighborhood of super-pixels and to the subject pixels within the super-pixel. While it is preferred that the distribution of error as to the individual pixels within the target super-pixels selected as the receiving neighborhood be in equal error amounts, this is not necessary for implementation of the invention herein. Alternatively, different amounts of error may be distributed to different pixels within a target neighboring super-pixel, according to a selected scheme, or even randomly. The invention herein thus addresses the handling the image processing of continuous tone input data at relatively low resolution including the steps of error diffusing the input data for provision to a printer capable of spatial resolution which is an integer multiple of the input data.

More particularly, according to the invention, the data storage problem is addressed by expanding the input data as it is processed. Thus, by way of an example, in the case of the printer output resolution being twice the input resolution to the data processing system associated with the printer, the input data is doubled up horizontally and vertically, resulting in 2×2 input pixel blocks having the same value as the original input pixel and similarly for higher resolution.

It is known that undesired artifacts are not seen at the resolution level of the super-pixels, these constituting multiplied blocks of smaller subject pixels. Further, this resolution level corresponds to the already high enough resolution level characterizing the high resolution output device selected. Thus, the simpler error diffusion method of this invention is effectively employed, calling for pushing the entire error in a particular higher resolution pixel into a selected nearby super-pixel within a predefined neighborhood thereof. As already suggested, according to the invention, the entire error of a first selected pixel within the predefined neighborhood is pushed into an immediately adjacent pixel. Typically, this will be the pixel next in line for processing.

By way of summary, when the last pixel of a particular neighborhood or block is processed to completion, the error in that final pixel is divided up and distributed at low resolution to adjacent pixels, i.e., super-pixels, according to Floyd and Steinberg, for example, but not necessarily. Various patterns for ordering the processing of pixels in a super-pixel block are possible depending on its dimensions. A spiral outward error distribution from the center of a super-pixel for large enough blocks is one way or embodiment of the invention. The approach described herein may appear limited to integer multiples of the input resolution In the output device. However, this limitation may be overcome by doing a linear interpolation of the input image so that at the desired output size, the image would be a non-integer multiple of the interpolated input. Error distribution according to the invention is incident to digital half-toning for application to printing and information processing systems, according to one mode of the invention. This is accomplished according to combined internal and external super-pixel error diffusion, and is effective for diffusing whole or fractional error contributions within and without predetermined super-pixels. Within a particular super-pixel, the entire error of an internal pixel is provided to a next internal subject pixel until a determined or selected final pixel error value within the selected super-pixel has been determined. The final, internal error value for the super-pixel is then distributed fractionally or wholly among selected super-pixels within its predetermined neighborhood.

The method of this invention permits low resolution continuous tone data to be error diffused on a high resolution printer minimizing the amount of extra processing required, and the amount of extra storage required is substantially reduced, as only one super-pixel at a time needs to be expanded for processing. Further, the invention applies directly to multiple gray level and color printers.

The above description does not constitute a statement of the scope of the invention. Rather, the claims which follow set forth the metes and bounds which define its scope.

What is claimed is:

1. A method for processing super-pixel representations of physical images being processed for subsequent presentation by diffusing error values derived by taking differences between input and output portions of the physical images being processed, the error values being diffused with respect to a selected super-pixel of predetermined dimensions and residing in a predetermined super-pixel neighborhood, and further with respect to selected subject pixels within the selected super-pixel, each of the subject pixels within the selected super-pixel having an assigned error value, the method comprising the steps of:

distributing at least a portion of the error value of a selected first subject pixel to another subject pixel within the selected super-pixel, whereby a final resultant error value is established for said another subject pixel;

establishing a final pixel error value for the selected super-pixel; and distributing at least a portion of the final pixel error value to selected super-pixels within the predetermined super-pixel neighborhood of the selected super-pixel.

2. The method of claim 1, wherein the distribution of error within said selected super-pixel is accomplished at least in part by distributing the entire error associated with a particular subject pixel to another subject pixel within the selected super-pixel.

3. The method of claim 1, wherein the distribution of error among the subject pixels within said selected super-pixel is accomplished according to a predetermined, ordered sequence.

4. The method of claim 1, wherein a portion of the error of a particular subject pixel within a super-pixel is allocated to an adjacent subject pixel within the selected super-pixel.

5. The method of claim 1, wherein the error of each subject pixel within a selected super-pixel is redetermined according to a predetermined order of succession.

6. The method of claim 5, wherein the error of a subject pixel which is last in the predetermined order of succession is deemed to be the final error value representative of the selected super-pixel, and the final error is allocated to selected other super-pixels.

7. The method of claim 1, wherein at least a portion of the final pixel error value to be distributed to other super-pixels in the neighborhood is applied to each of the subject pixels of another super-pixel.

8. The method of claim 7, wherein the error portions allocated to the subject pixels of a selected neighboring super-pixel are equally allocated.

9. The method of claim 7, wherein the distribution of the final pixel error value is allocated fractionally to neighboring super-pixels.

* * * * *